(No Model.)
J. H. SMITH.
FLOWER POT SUPPORT.
No. 496,173. Patented Apr. 25, 1893.
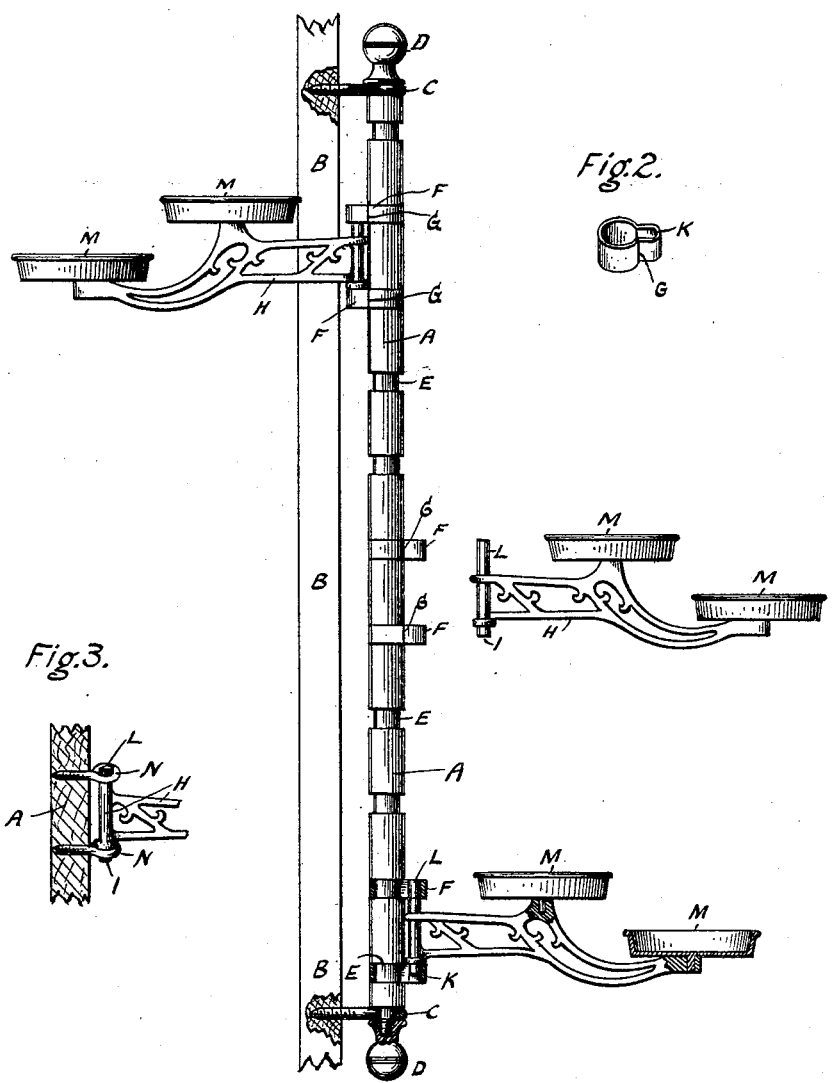
Witnesses:
Inventor:
John H. Smith.
By his Attorney,
Geo. D. Mitchell

UNITED STATES PATENT OFFICE.

JOHN H. SMITH, OF HAZLETON, PENNSYLVANIA.

FLOWER-POT SUPPORT.

SPECIFICATION forming part of Letters Patent No. 496,173, dated April 25, 1893.

Application filed September 2, 1892. Serial No. 444,897. (No model.)

*To all whom it may concern:*

Be it known that I, JOHN H. SMITH, a citizen of the United States, residing at Hazleton, in the county of Luzerne and State of Pennsylvania, have invented certain new and useful Improvements in Flower-Pot Supports; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to new and useful improvements in adjustable brackets or supports for flower pots and the like, and my object is to provide an appliance that shall be cheap and practical and at the same time ornamental, and one that can be easily put up and taken down. In order to attain these objects I have devised the construction and arrangement of parts illustrated in the accompanying drawings, wherein—

Figure 1 is a general view of one of my devices as it appears when attached to a window casing, in position for use, one of the auxiliary brackets being shown detached and another partly in section, to more clearly illustrate the construction. Fig. 2 is a detail view of one of the clasps ordinarily employed to attach the several brackets to the upright supporting rod or pole; and Fig. 3 is a broken-away view illustrating an alternative form of construction, which is cheaper but somewhat less substantial than that illustrated by Fig. 1.

Similar letters of reference indicate similar parts throughout the several views.

The mode of application and the operation of my invention are as follows: I construct my flower pot supports usually with a view to having them used in pairs, one of them being placed on either side of a properly exposed window, the rod or pole A, forming the fundamental part of the device, being pivotally attached to the window casing B, by means of the screw eyes or staples C, terminal balls D being subsequently attached to the ends of the rod or pole A in order to maintain the latter securely in position and to present a more finished appearance. The pole A is provided with a series of equi-distant annular grooves E in my preferred form of construction, and in order to adjust a bracket in position on it, I first fix one of the spring clasps or clips F, whose construction is more clearly illustrated in Fig. 2, in one of the grooves, it being slit at G for the purpose; whereupon it embraces the pole immovably. I then take one of the auxiliary brackets H and drop the lower pivotal extension I into the bearing K of the spring clasp or clip, and then placing a second clasp over the upper pivotal extension L of the bracket H, I spring it into position in the next groove, and the bracket is held securely on the pole, but at the same time so as to swing easily one way or the other. It is not absolutely essential for me to provide the rod or pole with the grooves E, for the clasps or clips F, being made of spring metal, will so intimately embrace the body of the pole that any weight placed on the bracket will only tend to make them clutch the pole the more firmly. The brackets H I usually construct so as to carry two standards, M, M, for the reception of the flower pots, but of course I may vary this number without departing from the spirit of my invention, to suit different purposes.

In order to meet the demand for a cheaper article, I may sometimes construct my device as illustrated in Fig. 3, doing away with the grooves and the spring clasps or clips, and simply employing screw-eyes, N, to receive the pivotal extensions I, L, of the brackets H. In that case I adjust the bracket in position exactly as before, simply running its upper pivotal extension up through the upper screw-eye, and letting the lower one drop through the lower screw-eye.

As will be readily understood, in order to fix my flower pot support in position for use, I have only to screw the screw-eyes C, C into the window casing and replace the terminal balls D; and then, the pole being in position, I may, if the whole number of brackets is not required, remove as many as I desire; and the remainder I can adjust in any of the positions provided, either high or low on the pole, at will.

A peculiar advantage in my arrangement is that the device being applied to the window casing, each individual bracket may either be swung round before the window, so as to be seen from the outside and receive the greatest possible amount of light, or it may be swung in the other direction, farther round toward the wall, to suit plants that require a less amount of light, and this construction does not interfere in the least with raising or lowering the window shades or arranging the curtains.

Having thus described my invention, what I claim, and desire to secure by Letters Patent, is—

A support for flower pots and the like, consisting of a rod or pole, staples for sustaining the said rod or pole at top and bottom and spacing it by an interval from the proximate wall surface, in combination with a series of flower pot brackets, having at their inner ends pivotal projections, and spring clasps or clips encircling said pivotal projections and the body of the pole, the latter being provided with annular grooves for the reception of said clasps or clips, substantially as described.

In testimony whereof I affix my signature in presence of two witnesses.

JOHN H. SMITH.

Witnesses:
P. F. BOYLE,
L. A. BOSWORTH.